(12) United States Patent
Xiong et al.

(10) Patent No.: US 9,208,578 B2
(45) Date of Patent: Dec. 8, 2015

(54) LOCAL BINARY PATTERN-BASED OPTICAL FLOW

(71) Applicant: Hulu, LLC, Santa Monica, CA (US)

(72) Inventors: Tao Xiong, Santa Monica, CA (US); Zhibing Wang, Beijing (CN); Heng Su, Beijing (CN); Guoxin Zhang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 144 days.

(21) Appl. No.: 14/001,488

(22) PCT Filed: Jun. 28, 2013

(86) PCT No.: PCT/CN2013/078333
§ 371 (c)(1),
(2) Date: Aug. 23, 2013

(87) PCT Pub. No.: WO2014/205769
PCT Pub. Date: Dec. 31, 2014

(65) Prior Publication Data
US 2015/0003686 A1      Jan. 1, 2015

(51) Int. Cl.
*G06K 9/00*     (2006.01)
*G06T 7/20*     (2006.01)

(52) U.S. Cl.
CPC ...................................... *G06T 7/204* (2013.01)

(58) Field of Classification Search
None
See application file for complete search history.

(56) References Cited

U.S. PATENT DOCUMENTS

| | | | |
|---|---|---|---|
| 2010/0188580 A1 | 7/2010 | Pascjalakis et al. | |
| 2012/0155743 A1* | 6/2012 | Kim ............................. | 382/154 |

FOREIGN PATENT DOCUMENTS

| | | |
|---|---|---|
| CN | 101729738 A | 6/2010 |
| CN | 102737359 A | 10/2012 |

OTHER PUBLICATIONS

International Search Report from International Patent Application No. PCT/CN2013/078333 mailed Apr. 3, 2014.

* cited by examiner

*Primary Examiner* — Atiba O Fitzpatrick
(74) *Attorney, Agent, or Firm* — Fountainhead Law Group PC

(57) ABSTRACT

In one embodiment, a method determines a first local binary pattern for a first image in a video and a second local binary pattern for a second image in the video. Then, the method determines an optical flow between the first image and the second image based on a distance between the first local binary pattern and the second local binary pattern. The optical flow is output for use in aligning the first image to the second image.

18 Claims, 11 Drawing Sheets

LOCAL BINARY PATTERN-BASED OPTICAL FLOW

CROSS-REFERENCE TO RELATED APPLICATIONS

This application claims priority to International Application No. PCT/CN2013/078333 filed Jun. 28, 2013 entitled "Local Binary Pattern-Based Optical Flow", which is incorporated by reference in its entirety.

BACKGROUND

Image alignment/tracking tracks an object of interest in multiple images or video frames. As the object of interest moves from frame to frame, the image tracking algorithm needs to compensate for translation, scaling, and rotation of the object. In one example, a tracking algorithm may use optical flow to track the object. Optical flow optimizes the appearance difference between object areas in adjacent frames to find the best image match in the next frame. The algorithm solves a non-linear least-square problem to determine parameters that describe the translation, scaling, and rotation. The least-square error function measures the distance between the object appearances in the adjacent frames via Euclidean distance.

The analysis to determine the optical flow typically relies on color or gray scale of the images. However, color or gray scale is heavily influenced by illumination. For example, special effects and open environment illustration in videos affect the accuracy of the image tracking algorithm.

SUMMARY

In one embodiment, a method determines a first local binary pattern for a first image in a video and a second local binary pattern for a second image in the video. Then, the method determines an optical flow between the first image and the second image based on a distance between the first local binary pattern and the second local binary pattern. The optical flow is output for use in aligning the first image to the second image.

In one embodiment, a non-transitory computer-readable storage medium contains instructions, that when executed, control a computer system to be configured for: determining a first local binary pattern for a first image in a video; determining a second local binary pattern for a second image in the video; determining an optical flow between the first image and the second image based on a distance between the first local binary pattern and the second soft local binary pattern; and outputting the optical flow for use in aligning the first image to the second image.

In one embodiment, an apparatus includes: one or more computer processors; and a non-transitory computer-readable storage medium comprising instructions, that when executed, control the one or more computer processors to be configured for: determining a first local binary pattern for a first image in a video; determining a second local binary pattern for a second image in the video; determining an optical flow between the first image and the second image based on a distance between the first local binary pattern and the second local binary pattern; and outputting the optical flow for use in aligning the first image to the second image.

The following detailed description and accompanying drawings provide a better understanding of the nature and advantages of particular embodiments.

DETAILED DESCRIPTION

Described herein are techniques for an image tracking system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
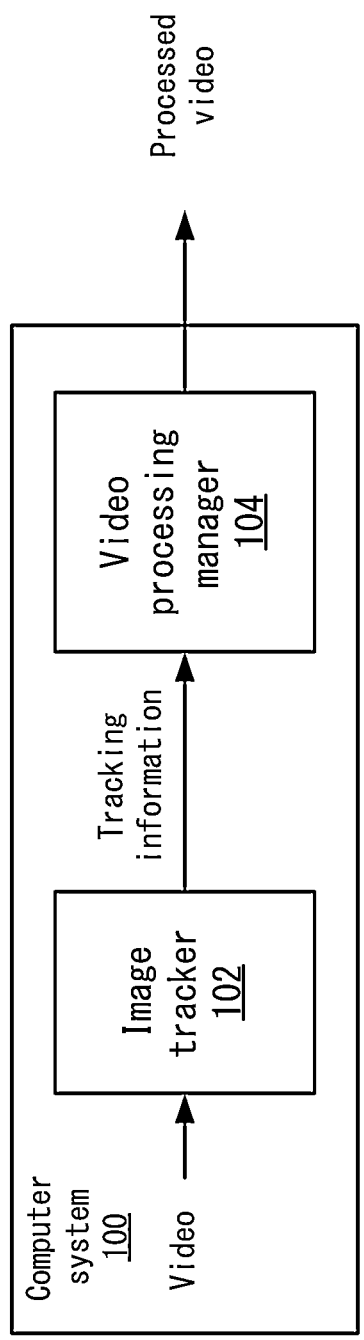
FIG. 1 depicts a computer system configured to process video according to one embodiment.

FIG. 1 depicts a computer system 100 configured to process video according to one embodiment. System 100 includes an image tracker 102 and a video processing manager 104. Image tracker 102 may track an object of interest over multiple frames of video. Then, image tracker 102 may output tracking information for the object to video processing manager 104. Video processing manager 104 may use the tracking information to enhance the video. For example, video processing manager 104 may insert a face box, other objects, links, or tags for the object that was tracked in the video. Video processing manager 104 may then output the processed video.

In one embodiment, image tracker 102 tracks faces in the video. However, image tracker 102 may track other objects, such as inanimate objects including hats, purses, etc. Face tracking refers to tracking the detected face in a video or a continuous image sequence from a start point (position, scaling, rotation, expression and so on) provided by face detection and/or face alignment techniques. Face tracking may be implemented online or offline. In online mode, the face is tracked while the video is being captured. Thus, only current and previous frames can be used to exploit information for tracking and the efficiency requirement is strict. In offline mode, the whole video file is generated ahead of time. Therefore, the information of any frames can be used to guide the tracking.

Face tracking is useful for several reasons. Video is generally composed of tens of thousands of frames. To locate a face in each frame, one simple idea is to perform face detection frame by frame. Since complex head rotation should be covered (both in-plane and out-plane rotations), the face detection may require more than 0.3 second per frame for a video frame of relatively low resolution (e.g., 360 by 640). If the frame rate is about 30 fps, this means that the duration of processing a video may be more than 9 times of that of the video itself, which may be infeasible in practice. In addition, the faces of the same person in successive frames cannot be associated by detecting faces separately in each frame. Thus, in subsequent face clustering or face recognition processes, the amount of input face samples is multiplied greatly by the number of individual frames in which a face is detected.

Considering the continuity of video along time axis and the redundancy between adjacent frames, face tracking can be employed instead of face detection in each frame. Since face tracking is very computationally efficient, the time cost can be significantly reduced. Moreover, the faces of the same person in different frames can be linked by the face tracks. Thus, for each face track, only one face sample is needed in subsequent face clustering or recognition, which can be selected from the track to represent all the samples in this track.

A face track may be indicated by a visual object placed in the video frame, for example by a box enclosing the area just around the detected and tracked face. To provide good user experience, such tracking indications should vibrate as little as possible along the time axis. Vibration damping for the visual tracking indicator may be easily attained by face tracking based on time relevance of adjacent frames.

Image tracker 102 uses optical flow to track an object across frames of the video. Optical flow is based on the object appearance and nonlinear least square optimization. By adopting an inverse compositional technique, the solution for optical flow may be very efficient. Optical flow makes use of continuity of adjacent frames with three assumptions. First, the appearance of the target object is assumed to be similar or the same in adjacent frames. Second, the target object is assumed to have a complex texture. Third, the variation of pose parameters (translation, scaling, rotation) is assumed to be small between respective frames. For face tracking in a video stream, the above three assumptions are generally satisfied.

Given a face box for a detected face in a first frame, optical flow optimizes the appearance difference between face areas in adjacent frames to find the best face box in the next frame. The parameters to describe a face box may include translation and scale.

As discussed above, illumination may cause problems when tracking the object across the frames. Local binary pattern is a texture descriptor that encodes a pixel and its neighborhood into a binary string to reflect the local texture structure. Due to the locality and binarization used by local binary pattern, local binary pattern is insensitive to global illumination variations between frames of video. As will be discussed in more detail below, local binary pattern is a nonlinear feature where each decimal LBP value between 0-255 represents a texture pattern and is a categorical variable (e.g., limited to a number of values). To measure the distance between two LBP values, Hamming distance may be employed due to the binary values being used. As discussed above in the background, optical flow measures the distance between objects in two frames based on a Euclidean distance. The Euclidean distance is the ordinary distance that will be measured with a ruler and is different from a Hamming distance, which measures the distance between two binary numbers. In order to use local binary pattern in tracking for optical flow, particular embodiments need to prove that the Hamming distance between two binary numbers can be used within an optical flow framework that is based on Euclidean distance.

Image tracker 102 wants to align a template T(x) to an image I(x), where $x=(x,y)^T$ denotes a column vector containing the pixel coordinates. The template T(x) may be in a first frame and the image I(x) may be in an adjacent frame. Due to movement of an object across the frames, warp may occur between T(x) and I(x). The warp may be characterized by some change in scaling, translation, and/or rotation. The warp between T(x) and I(x) is parameterized by parameter p and denoted by W(x;p). That is, W(x;p) defines the warp between T(x) and I(x). The translation transformation may be defined as follows:

$$W(x;p)=(x+p_1,y+p_2)^T \quad (1)$$

where $p=(p_1,p_2)^T$ are translations, i.e. optical flow vector. For translation-scaling transformation, $$W(x;p)=(1+p_1)(x,y)^T+(p_2,p_3)^T \quad (2)$$

where $p_1$ is scaling and $(p_2, p_3)^T$ is translations. For affine transformation, $$W(x; p) = \begin{pmatrix} 1 + p_1 & p_2 \\ p_3 & 1 + p_4 \end{pmatrix}\begin{pmatrix} x \\ y \end{pmatrix} + \begin{pmatrix} p_5 \\ p_6 \end{pmatrix} \quad (3)$$

The 6 parameters contain the six degrees of 3 rotations and 3 translations in 3D motion.

Given T(x) and I(x), to obtain the transformation parameters p, optical flow is to minimize the sum of square error between T(x) and I(x) warped back onto the coordinate frame of template:

$$J(p) = \sum_x [I(W(x; p)) - T(x)]^2 \quad (4)$$

Equation (4) uses Euclidean distance to determine the transformation parameter p. Since T(x) and I(x) are non-linear functions of x, solving the optical flow can be viewed as a non-linear least-square problem. The optical flow can be linearized first by a Taylor expansion and then resolved by a Gaussian-Newton iteration. As discussed above, to achieve a high aligning accuracy, three assumptions should be met in optical flow: 1) the appearance of the target object should be similar or the same in T(x) and I(x); 2) the target object should be abundant in texture; and 3) the warp parameters (translation, scaling, and rotation) should be small. The last two assumptions can be satisfied by selecting a rich texture area for alignment and using a pyramid-based strategy as described above. In an open environment, illumination is complex and greatly impacts the image gray scale or color. Thus, these characteristics may degrade the alignment accuracy because the appearance of the target object changes due to the illumination. Robust features should accordingly be employed instead of gray scale or color.

Local binary pattern provides the robustness that can be used in image tracking against illumination. For each pixel in an image, local binary pattern compares its gray scale with its neighborhood (e.g., typically eight adjacent pixels around it). If the gray scale is greater than its neighbor, the algorithm outputs a 1. Otherwise, the algorithm outputs a 0. This result is a binarized gray scale gradient.

To solve a non-linear least square problem, the parameters may be obtained iteratively. Some further considerations may be as follows:

First, to cover large displacement of faces both in and out of the image plane, a multi-resolution strategy with pyramid structure may be employed.

Second, a two-step tracking strategy may be used: 1) track only translation of the face area using pyramid structure; 2) track translation and scale synchronously in single resolution.

Third, to avoid the track drifting into background, an online learning model may be adopted in the second step above. Each pixel in the appearance of face area may be modeled as a Gaussian distribution with the mean and variance updated during the tracking. If the track error is greater than a pre-defined threshold, the tracking may be terminated.

Figure 2:
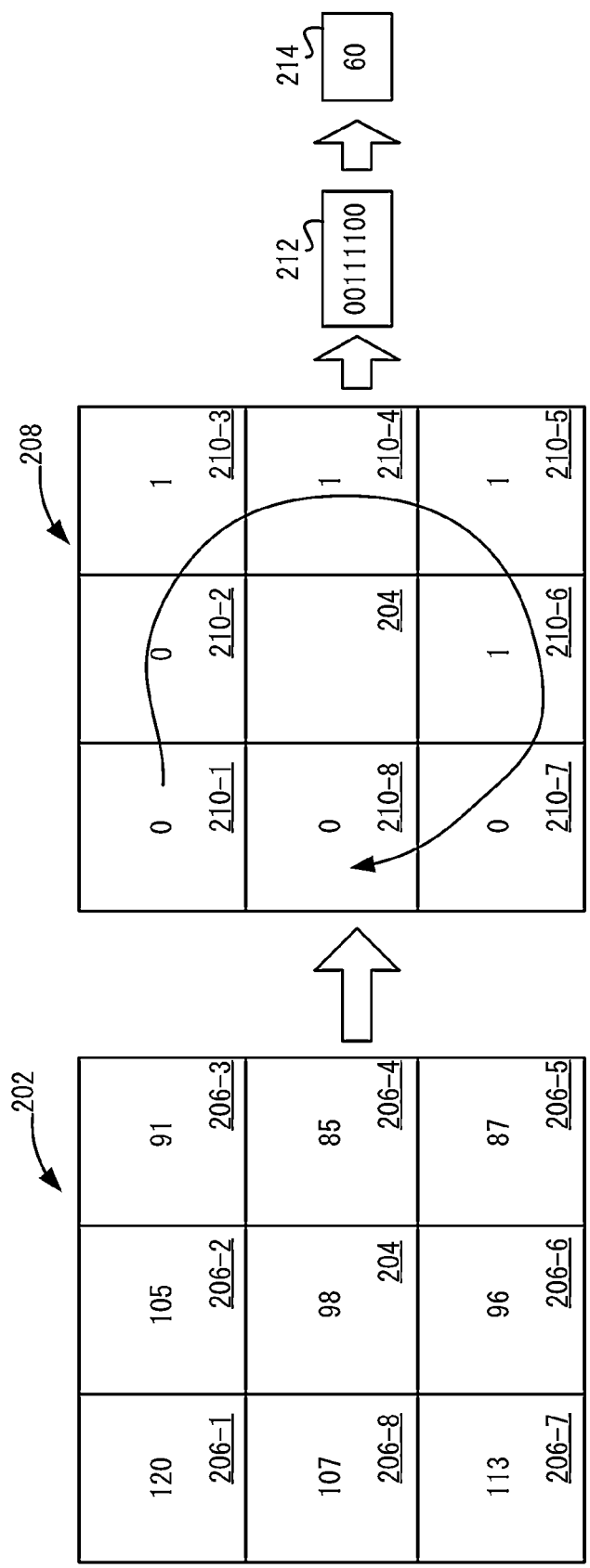
FIG. 2 depicts an example of a local binary pattern according to one embodiment.

FIG. 2 depicts an example of a local binary pattern according to one embodiment. At 202, values for gray scale of an image are shown for different pixels. A pixel of interest is shown at 204 and adjacent pixels are shown at 206-1-206-8. The different gray scale values are shown for each pixel. For example, pixel 204 includes a gray scale value of 98 and the eight adjacent pixels include gray scale values of 120, 105, 91, 85, 87, 96, 113, and 107. To perform the comparison, the pixel at 204 is compared with each of the pixels shown at 206-1-206-8 to determine binary values for each pixel. The local binary pattern is shown at 208. At 210-1, the binary value is 0. This is because 98 is compared to 120 where 98 is less than 120. The same comparison occurs between pixel 204 and each of pixels at 206-2-206-8. If the comparison starts at the top left neighbor at 206-1 and goes in the clockwise direction ending at the left neighbor at 206-8, then the 8-bit binary string is generated as "00111100" as shown at 212. The binary number translates to a Euclidean number of 60 shown at 214. The Euclidean number is a decimal digit 60.

Local binary pattern reflects a local texture structure, such as a corner, edge, peak, or noise, etc. for the image. For example, the texture pattern shown in FIG. 2 represents an edge tilted to the right. The local binary pattern encodes the sign of gray scale gradients and removes the gradients' magnitude. Thus, local binary pattern is insensitive to the global illumination that usually changes the magnitude, but not the sign of the gray scale gradients. Accordingly, local binary pattern is a good candidate that meets the first assumption of optical flow, which states that the appearance of the target object should be similar or the same in T(x) and I(x). This is because local binary pattern does not change significantly due to illumination.

As discussed above, the error function to determine the transformation parameters p that are defined in optical flow is based on Euclidean distance. Since the local binary pattern value is categorical variable, the LBP value cannot be operated on by Euclidean arithmetic. For example, the distance between LBP values of 56 and 88 is not 32. To measure the distance between two LBP values, the values need to be turned into binary strings and then the number of different bits between them is computed. This is referred to as a Hamming distance.

Figure 3:
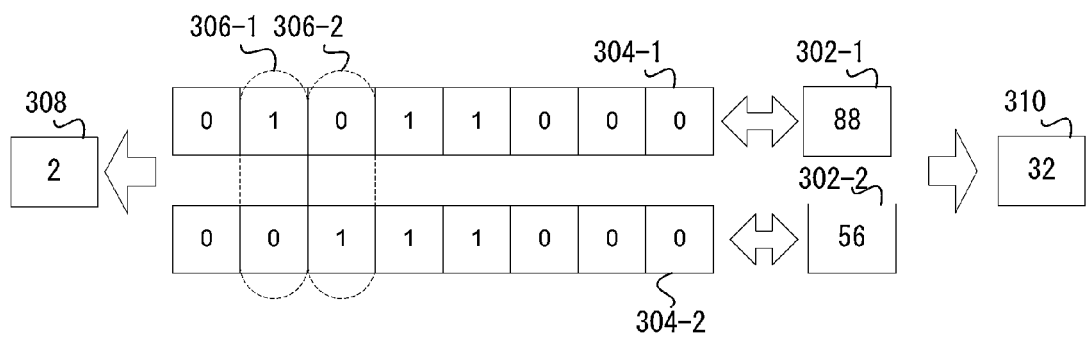
FIG. 3 depicts an example of determining the Hamming distance for local binary pattern values according to one embodiment.

FIG. 3 depicts an example of determining the Hamming distance for local binary pattern values according to one embodiment. At 302-1, an LBP value for T(x) is 88 and at 302-2, an LBP value for I(x) is 56. These values are converted into binary strings shown at 304-1 and 304-2, respectively. That is, 88 converts into a value of "01011000" and 56 converts into a value of "00111000". The conversion converts the LBP value into an 8-bit binary string. The Hamming distance may be determined by comparing the different bits between the binary strings. For example, at 306-1 and 306-2, different values exist between the two strings. This provides a Hamming distance of "2" shown at 308. The Hamming distance measures the difference between the two texture patterns calculated for T(x) and I(x). The Euclidean distance between 88 and 56 is shown at 310 as "32". The value of 32 for the Euclidean distance is different from the value of 2 for the Hamming distance. However, further analysis of Equation (4) in the optical flow framework yields that the Hamming distance may be used in Equation (4) to determine the transformation parameters. The Hamming distance is converted to a summation of square Euclidean distances. The following illustrates a proof that the Hamming distance can be used in the optical framework.

Mathematically, Euclidean distance $d_E$ between two vectors v and u is $$d_E(v, u) = |v - u| = \sqrt{\sum_n (v_n - u_n)^2} \quad (5)$$

And Hamming distance $d_H$ between two binary vectors v and u is $$d_H(v, u) = \sum_n XOR(v_n, u_n) \quad (6)$$

Since $v_n$ and $u_n$ are binary variables, $XOR(v_n, u_n) = |v_n - u_n| \in \{0, 1\}$. Further, since $1^2 = 1$ and $0^2 = 0$, then $|v_n - u_n| = (v_n - u_n)^2$. Thus $$d_H(v, u) = \sum_n XOR(v_n, u_n) = \quad (7)$$
$$\sum_n |v_n - u_n| = \sum_n (v_n - u_n)^2 = d_E^2(v, u) = \sum_n d_E^2(v_n, u_n)$$

According to (7) and (4), it is possible to introduce LBP into optical flow framework. For an LBP image LBP(I(x)), divide it into 8 binary images, each of which is formed by one bit in the 8 bit binary string and denoted by $LBP_n(I(x))$. Then, the error function in (4) becomes $$J(p) = \sum_x d_H(LBP(I(W(x; p))), LBP(T(x))) \quad (8)$$
$$= \sum_{n=1}^{8} \sum_x (LBP_n(I(W(x; p))) - LBP_n(T(x)))^2$$

where $LBP_n(I(x))$ denotes the binary image divided from LBP(I(x)). Equation (8) can be minimized by the Gaussian-Newton iteration efficiently, which is one way to solve least square problems.

In one example, the vectors v and u are as follows:

$$u=(0, 1, 0, 1, 1, 0, 0, 0)^T \text{ and } v=(0, 0, 1, 1, 1, 0, 0, 0)^T$$

Also, $u_n, v_n \in \{0, 1\}$ and $XOR(0, 0)=0=|0-0|=(0-0)^2$, $XOR(1, 0)=1=|1-0|=(1-0)^2$, $XOR(0, 1)=1=|0-1|=(0-1)^2$, $XOR(1, 1)=0=|1-1|=(1-1)^2$. So $XOR(u_n, v_n)=|u_n-v_n|=(u_n-v_n)^2=d_E^2(u_n, v_n)$ $d_H(v, u)=\Sigma_n XOR(v_n, u_n)=XOR(0, 0)+XOR(1, 0)+XOR(0, 1)+XOR(1, 1)+XOR(0, 0)+XOR(0, 0)+XOR(0, 0)=0+1+1+0+0+0+0+0=2$ $d_E^2(v, u)=\Sigma_n d_E^2(v_n, u_n)=(0-0)^2+(1-0)^2+(0-1)^2+(1-1)^2+(0-0)^2+(0-0)^2+(0-0)^2=0+1+1+0+0+0+0=2$ From the above, it can be seen that the Hamming distance when applied to Equation (4) is converted to a summation of square Euclidean distances Noise Sensitivity Local binary pattern may be sensitive to noise especially in the area with smooth gray scales due to a step function that LBP uses to compare the gray scale values. For example, image tracker 102 uses the step function to compare the gray scale values as shown in FIG. 2. For example, referring to FIG. 2, the gray scale value of 98 of pixel 204 is compared to the gray scale value of 96 of pixel 206-6. If any noise results, the value of pixel 206-6 may change from 96 to 100. This may cause the wrong results for the binary pattern.

Figures 4A, 4B, 4C:
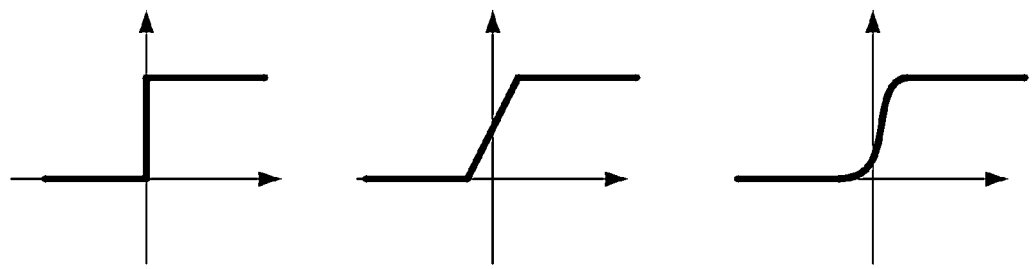
FIG. 4A shows an example of a step function according to one embodiment.
FIG. 4B shows a piecewise linear function (PLF) and FIG. 4C shows a sigmoid function (SF) that may be used in the local binary pattern calculation according to one embodiment.

The step function outputs either 0 or 1 based on the comparison. For example, FIG. 4A shows an example of a step function according to one embodiment. As shown, the transition between 0 and 1 is a step in that there is no slope between 0 and 1. That is, the value is either 0 or 1 when image tracker 102 compares the gray scale values using the step function. The value of 98 when compared to 96 always yields a value of 1 and a comparison of 98 and 100 always yields a value of 0. Thus, if slight noise results that changes the value for pixel 206-6 from 96 to 100, the local binary pattern number that results from the comparison changes from 1 to 0 due to the use of the step function. This may affect the results for determining the transformation parameters p using the error function.

To alleviate the impact of noise, image tracker 102 may use a soft-step function that includes a slope between the values of 0 and 1. For example, FIG. 4B shows a piecewise linear function (PLF) and FIG. 4C shows a sigmoid function (SF) that may be used in the local binary pattern calculation according to one embodiment. In FIG. 4B, a slope is found between 0 and 1 for the PLF function. In FIG. 4C, the curvature of the SF function between 0 and 1 also results in a slope between 0 and 1. The slope of PLF and the curvature of SF can be adjusted by a positive parameter c as follows:

$$f(x) = \begin{cases} 0, & \text{if } x < -c \\ (x+c)/2c, & \text{if } -c \leq x \leq c \\ 1, & \text{if } x > c \end{cases} \quad (9)$$

$$f(x) = \frac{1}{1+\exp(-cx)} \quad (10)$$

Equation (9) illustrates the slope adjustment that can be performed for PLF and Equation (10) illustrates the adjustment that can be performed for SF.

Figure 4D:
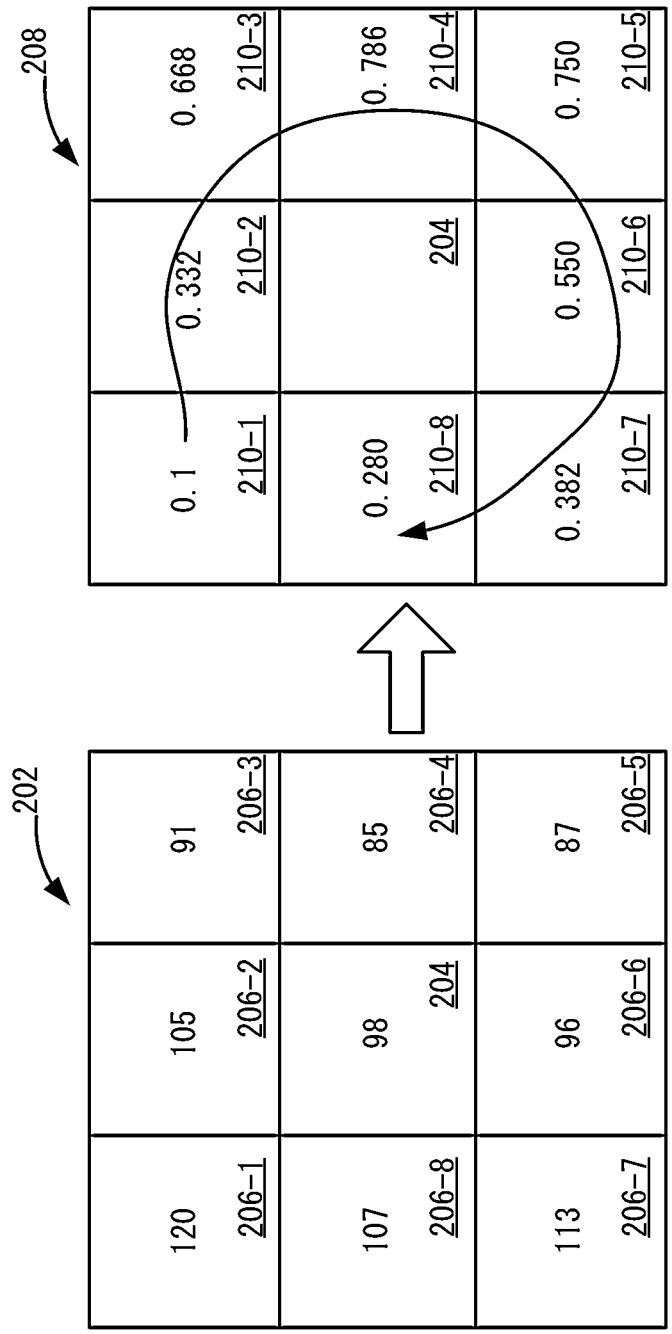
FIG. 4D shows an example of soft binary values according to one embodiment.

Since SF or PLF around 0 has a much smoother variance than the step function, weak noise cannot drastically change the value of the binarized gradients. For example, the comparison of 96 and 98 may yield 0.55 and the comparison of 98 and 100 may yield 0.45. The values of 0.55 and 0.45 are less different than using only binary values 0 and 1. Thus, the local binary pattern used by image tracker 102 may be referred to as a soft local binary pattern (SLBP) due to the use of the piecewise linear function or the sigmoid function. Accordingly, the effect of noise when using LBP is alleviated when using SLBP. In this case, the error function in (8) becomes:

$$J(p) = \sum_{n=1}^{N} \sum_{x} (SLBP_n(I(W(x; p))) - SLBP_n(T(x)))^2 \quad (11)$$

where J(p) is an error function for transformation parameters p, N is a number of binary bits (N depends on the definition of the local binary pattern and could be 4 or 8), SLBP is the soft local binary pattern using the soft step function, I is the first image, T is the second image, and W(x; p) is a warp between the first image and the second image. Referring to FIG. 4D and equation 10, the central pixel at 204 is denoted as p, and its neighbor pixels are denoted as $p_1 \sim p_8$ (206-1-206-8), the SLBP for these 8 pixels are $1/(\exp(-(p-p_i)*0.1)$, $i=1, \ldots, 8$. For example, $p=96$, $p_6=98$, then $SLBP_6=1/(1+\exp(-(96-98)*0.1))=0.55$. For image I, the $SLBP_i(I)$, $i=1, \ldots, 8$ can be calculated and also, for image T, the $SLBP_i(T)$, $i=1, \ldots, 8$ can be calculated. Then, the summation is $\text{sum}((SLBP_i(I)-SLBP_i(T))^2)$ for the central pixel. In the above, the hamming distance has been replaced by the summation of square Euclidean distances.

Reduction of the Number of Gradients Used

In Equation (11) above, eight items are involved in the summation that correspond to eight directions of gradients, respectively, for T(x) and I(x). In one embodiment, image tracker 102 removes half of them, however. That is, referring to FIG. 2, instead of using all eight pixel values 206-1-206-8, four of them are removed such that pixel values 206-1, 206-2, 206-3, and 206-8 are used in Equation (11) and not pixel values 206-4, 206-5, 206-6, and 206-7. The following will show why four of these values may be removed. Considering the pixels I(x, y), I(x−1, y), and I(x+1, y), where x and y are coordinates, the gradient I(x, y)−I(x+1, y) is the same as the gradient I(x', y)−I(x'−1, y) if the sign is ignored and x'=x+1. Since the error in Equation (11) includes all pixels in the image, the item involving the gradient I(x, y)−I(x+1, y) and the item involving the gradient I(x, y)−I(x−1, y) is nearly the same except the image on the pixel boundary. The two items may be opposites in relation to pixel 204. For efficiency purposes, image tracker 102 removes one of these two items from the calculation. This can be performed for each of the pixel values 206-4, 206-5, 206-6, and 206-7.

Figure 5A:
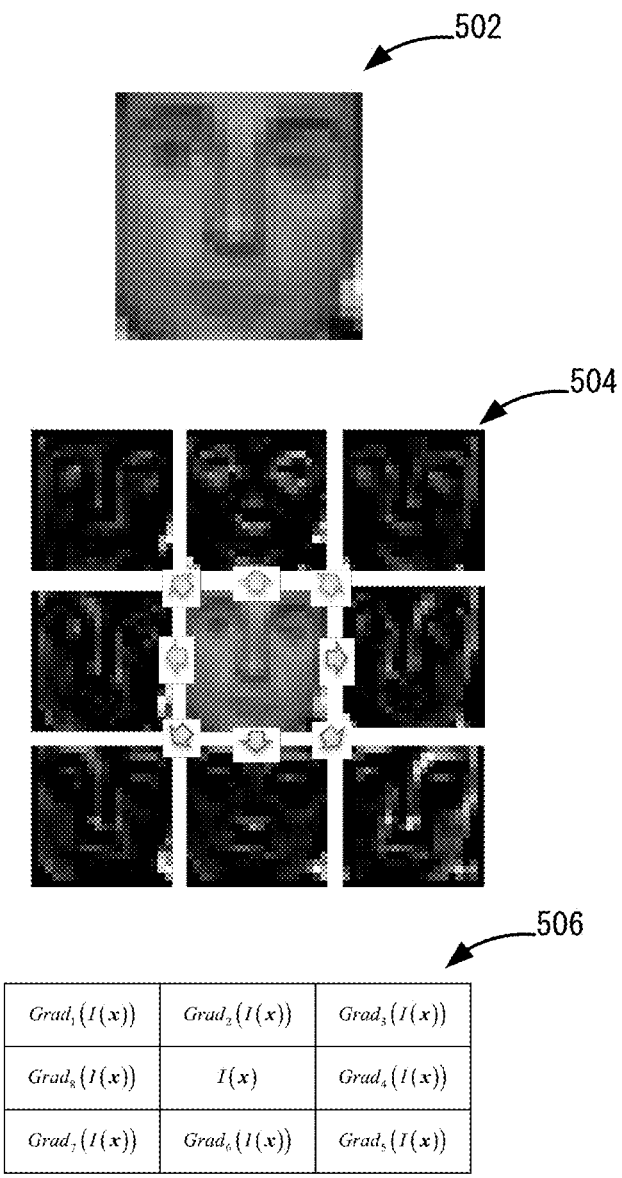
FIG. 5A shows a gray image and 8 gradients according to one embodiment.
Figure 5B:
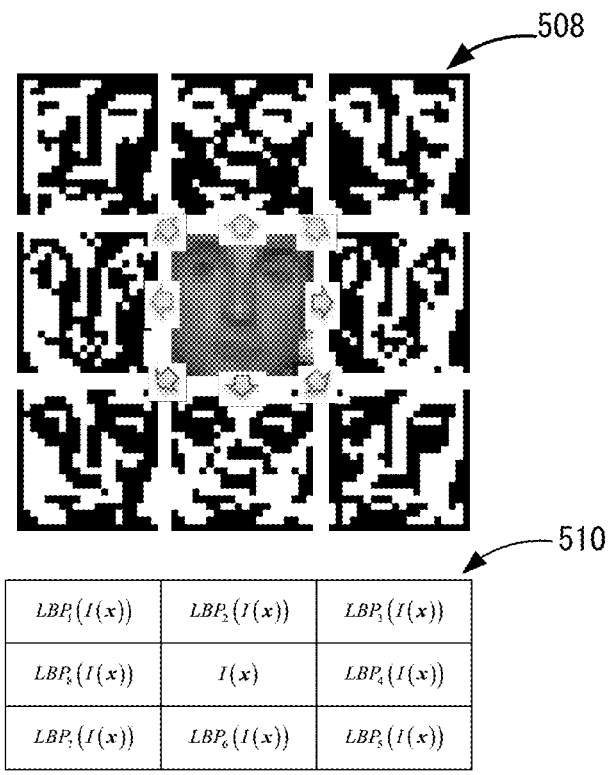
FIG. 5B shows 8 binarized gradient images and the 8 binarized gradients are summarized with respect to the gray image shown as I(x) according to one embodiment.
Figure 5C:
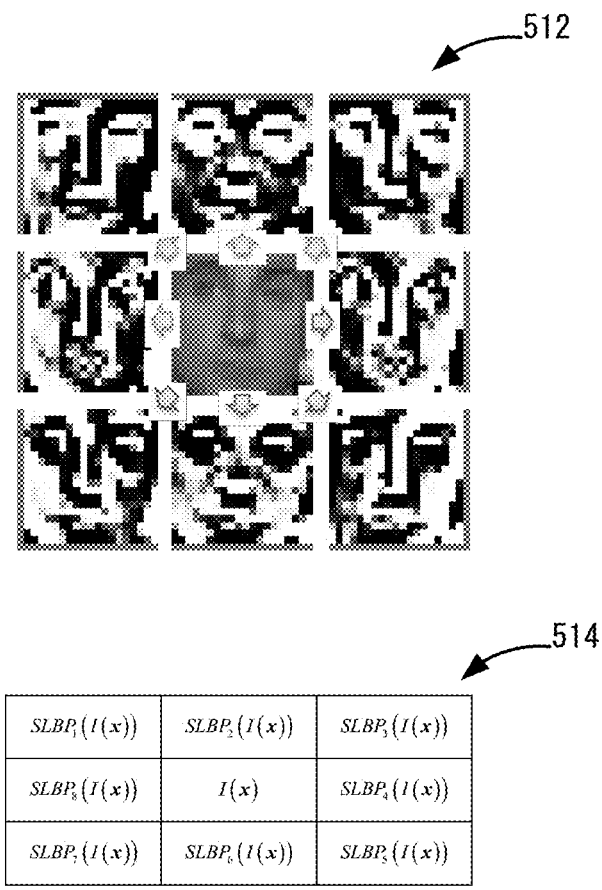
FIG. 5C shows 8 soft binarized gradient images and the 8 soft binarized gradients are summarized with respect to the gray image shown as I(x) according to one embodiment.

FIG. 5A shows a gray image 502 and 8 gradients at 504 according to one embodiment. The 8 gradients are summarized at 506 with respect to the gray image shown as I(x). FIG. 5B shows 8 binarized gradient images at 508 and the 8 binarized gradients are summarized at 510 with respect to the gray image shown as I(x) according to one embodiment. Also, FIG. 5C shows 8 soft binarized gradient images at 512 and the 8 soft binarized gradients are summarized at 514 with respect to the gray image shown as I(x) according to one embodiment.

For discussion purposes, the relationship between the left and right gradient images ($\text{Grad}_8(I(x))$ and $\text{Grad}_4(I(x))$) will be discussed. However, the relationship between up and down gradient images ($Grad_2(I(x))$ and $Grad_6(I(x))$), up-left and down-right gradient images ($Grad_1(I(x))$ and $Grad_5(I(x))$), up-right and down-left gradient images ($Grad_3(I(x))$ and $Grad_7(I(x))$) are similar.

Figure 6:
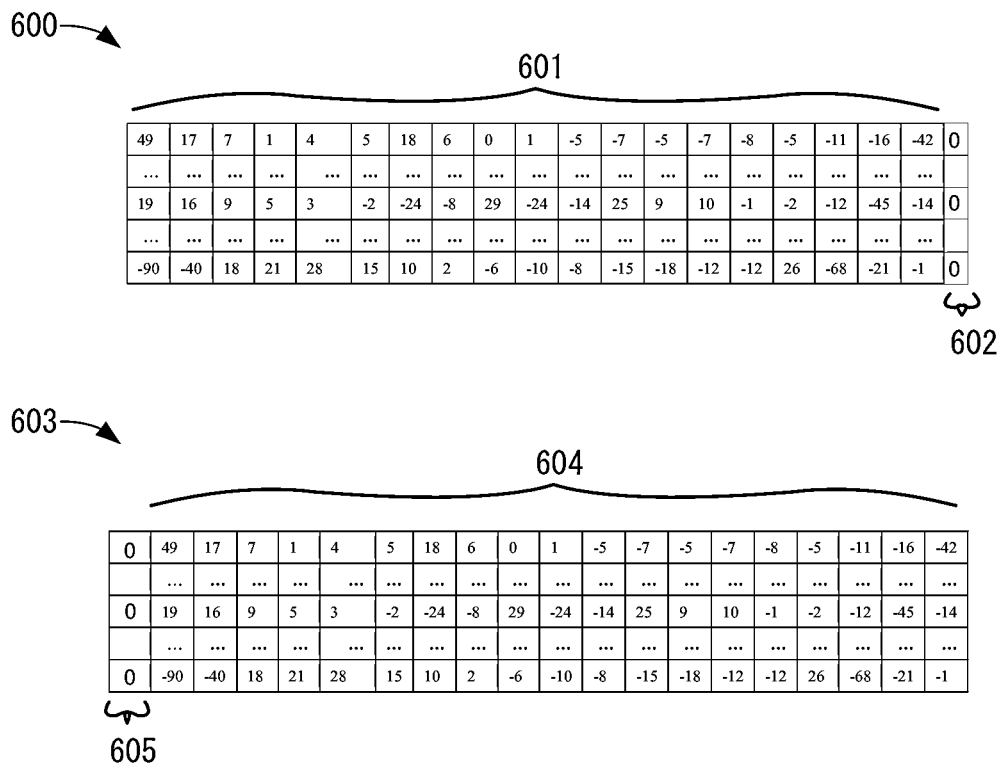
FIG. 6 shows the value of left gradient image and the value of right gradient image according to one embodiment.

FIG. 6 shows the value of left gradient image $Grad_8(I(x))$ (row 1, 10, 20) at 600 and the value of right gradient image $Grad_4(I(x))$ (row 1, 10, 20) at 603 according to one embodiment. $Grad_8(I(x))$ is denoted as a matrix $G_8(I)=[A, u]$, $G_8$ is 20 by 20, u is a 20 by 1 vector shown at 602 (here, u is all-0 vector on the image boundary and the value of u is not important compared to A), and A is 20 by 19 matrix shown at 601. Then, as shown at 603, $Grad_4(I(x))$ can be denoted as $G_4(I)=[u, -A]$. u is shown at 605 and −A is shown at 604.

As can be seen, the values for A and −A are the same except the values are shifted to the right one pixel. Also, the values for u are the same except the values are on different boundaries (right and left).

For binarized gradient images shown in FIG. 5C, if $LBP_8(I(x))=L_8(I)=[B, v]$, then $LBP_4(I(x))=L_4(I)=[v, 1−B]$, where 1 is all-1 matrix with the size of B. (since binarization maps the gradient from range $(-\infty, +\infty)$ to $[0, 1]$, so here is 1−B instead of −B). B is the same as A above and v is the same as u above.

For soft binarized gradient images, if $SLBP_8(I(x))=S_8(I)=[C, w]$, then $SLBP_4(I(x))=S_4(I)=[w, 1−C]$. C is the same as A above and w is the same as u above.

Since in optical flow, the error function for SLBP is $J(p)=\Sigma\|S_n(I)-S_n(T)\|^2$. Let $S_8(I)=[C_I, w_I]$, $S_8(T)=[C_T, w_T]$, then $S_4(I)=[w_I, 1−C_I]$ and $S_4(T)=[w_T, 1−C_T]$. So $S_8(I)-S_8(T)=[C_I-C_T, w_I-w_T]$ and $S_4(I)-S_4(T)=[w_I-w_T, C_T-C_I]$. Since $\|\ \|^2$ is the summation of the square of each element of the matrix, then $\|S_8(I)-S_8(T)\|^2=\|S_4(I)-S_4(T)\|^2$. Similarly, $\|S_n(I)-S_n(T)\|^2=\|S_{n-4}(I)-S_{n+4}(T)\|^2$, n=1, 2, 3. Thus, image tracker 102 can remove $\|S_{n+4}(I)-S_{n+4}(T)\|^2$, n=1, 2, 3, 4 and only keep $\|S_n(I)-S_n(T)\|^2$, n=1, 2, 3, 4.

Overall Method Flow

Figure 7:
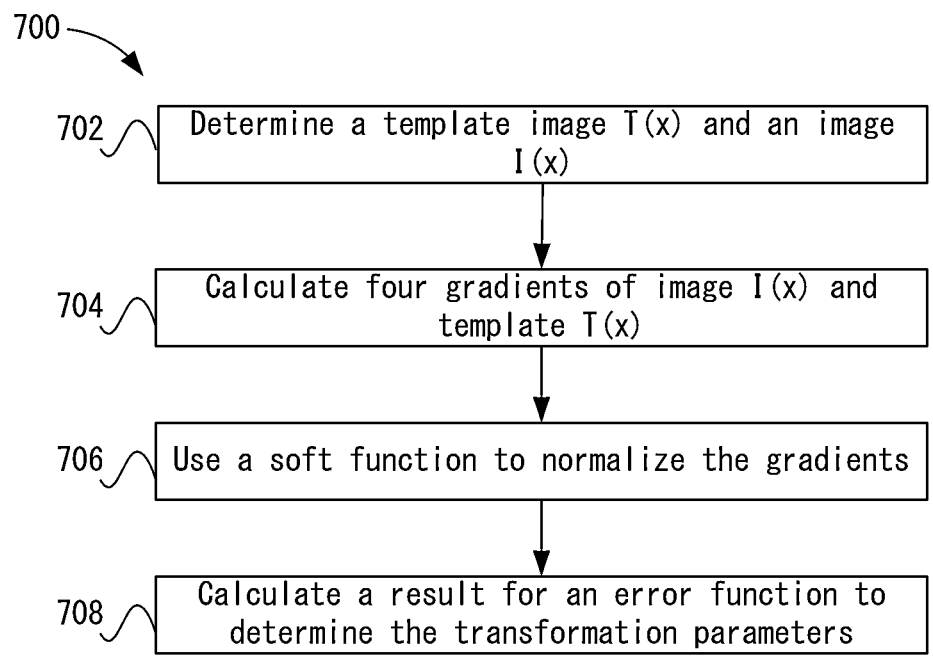
FIG. 7 depicts a simplified flowchart of a method for determining the optical flow according to one embodiment.

FIG. 7 depicts a simplified flowchart 700 of a method for determining the optical flow according to one embodiment. At 702, image tracker 102 determines a template image T(x) and an image I(x). At 704, image tracker 102 calculates four gradients of image I(x) and template T(x). The four gradients correspond to a subset of the pixels surrounding the target pixel. The subset is chosen such that a second subset that is not used is nearly the equivalent to the four gradients used as described above.

At 706, image tracker 102 uses a soft function, such as a sigmoid function or piecewise linear function, to normalize the gradients. For example, the target gradient is compared to each of the four neighboring gradients. At 708, image tracker 102 calculates the error function as shown in Equation (11) above to determine the transformation parameters. For example, inverse-compositional fitting as described in Equation (3) is used to solve the error function shown in Equation (11). This yields the transformation parameters p for the optical flow.

Accordingly, local binary pattern is incorporated into the optical flow framework for robust image alignment/tracking. The Hamming distance between two LBP values is converted to a summation of square Euclidean distances, which then can be minimized efficiently by Gaussian-Newton iteration with inverse compositional fitting. Also, to overcome the intrinsic noise sensitivity of LBP, SLBP is used with soft-binarized gradients instead of hard binarization. Additionally, computation is saved by simplifying the number of gradients used in the optical flow framework calculation.

System Overview

Figure 8:
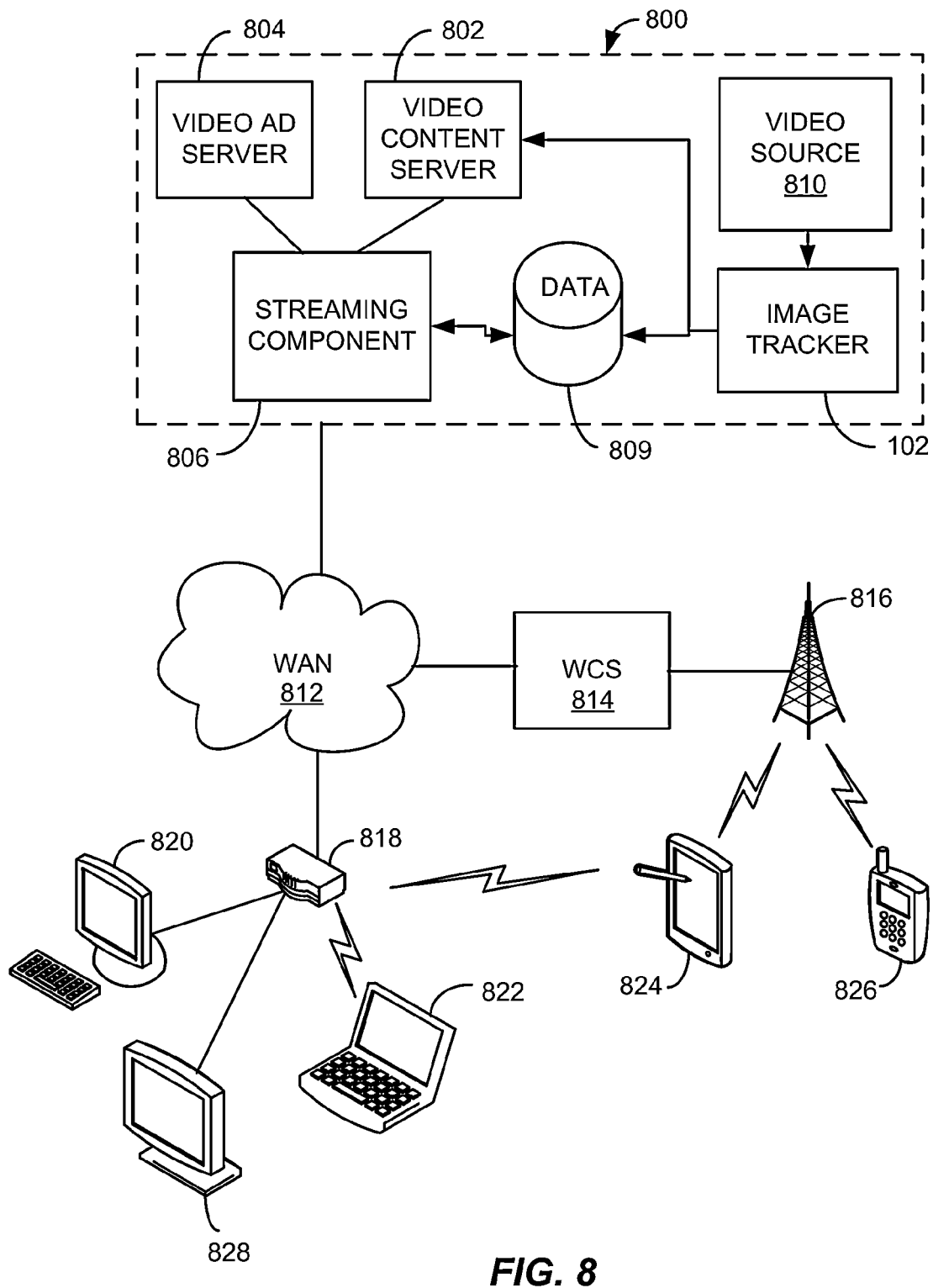
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution of content prepared according to the present disclosure. It should be appreciated that the present technology is not limited to streaming video applications, and may be adapted for other applications.

Video data may be obtained from one or more sources for example, from a video source 810, for use as input to a process for image tracking (image tracker 102) for one or more objects appearing in the video. The one or more objects may include, for example, a human face. The input video data may comprise raw or edited frame-based video data in any suitable digital format, for example, MPEG-1, MPEG-2, MPEG-4, VC-1, or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers.

The input video data may be provided to image tracker 102 for preparation of video content that is object-recognition enabled. Image tracker 102 may be implemented by a computer, for example, one or more computers configured with image processing applications and hardware as described herein. Image tracker 102 is configured to receive video data, and process the video data using one or more automatic or semi-automatic processes as described herein to track images based on objects appearing in the frame-based images making up the video data.

Processed video data from image tracker 102 may be provided to a video content server 802 of the video streaming system 800. In the alternative, or in addition, the module 808 may store processed video data in a memory, for example, data store 809. In addition, image tracker 102 may provide metadata to, and/or obtain metadata from, the data store 809 or other data source. The metadata may relate to objects appearing in the video data that the content preparation module has made interactive. For example, if certain faces appearing in the video data are recognized and prepared as interactive objects in the output video, the metadata may include biographical or other information relating to respective persons, e.g., actors, belonging to the recognized faces. The metadata may be related to the recognized face or object using one or more identifiers; for example, in the case of actors, the name and birthdate of each actor.

The video streaming system 800 may include one or more computer servers or modules 802, 804, and/or 806 distributed over one or more computers. Each server 802, 804, 806 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The ad server 804 may serve the video advertising segments as directed by a user interface controller (not shown).

The video streaming system 800 may further include an integration and streaming component 806 that integrates video content and video advertising into a streaming video segment. A controller (not shown) may determine the selection or configuration of advertising in the streaming video based on any suitable algorithm or process. The video streaming system 800 may include other modules or units not depicted in FIG. 8, for example administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network 814, or some combination of these or similar networks.

One or more client devices may be in communication with the video streaming system 800, via the data communication network 812 and/or other network 814. Such client devices may include, for example, one or more laptop computers 822, desktop computers 820, "smart" mobile phones 826, notepad devices 824, network-enabled televisions 828, or combinations thereof, via a router 818 for a LAN, via a base station 816 for a wireless telephony network 814, or via some other connection. In operation, such client devices 820, 822, 824, 826, or 828 may send and receive data or instructions to the system 800, in response to user input received from user input devices or other input. In response, the system 800 may serve video segments and metadata from the data store 809 responsive to selection of interactive links to the client devices 820, 822, 824, 826, or 828 and customize the additional content based on parameters of the client devices, for example respective geographic locations of the client devices, or demographic information concerning respective users of the client devices. The devices 820, 822, 824, 826, or 828 may output interactive video content from the streaming video segment using a display screen, projector, or other video output device, and receive user input for interacting with the video content based on one or more links associated with a tracked face or other object appearing in the video content.

Distribution of audio-video data may be implemented from a content server 806 to remote client devices over computer networks, telecommunications networks, and combinations of such networks, using various methods, for example streaming. In streaming, a server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Unlike the web server, the streaming media server 806 may communicate with the client device using control messages and data messages to adjust to changing network conditions as the video is played. These control messages can include commands for enabling control functions such as fast forward, fast reverse, pausing, or seeking to a particular part of the file at the client.

Since a streaming media server 806 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth. Streaming media players may not rely on buffering to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of each video program, for example, using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Output from a media player on the client device may occupy only a portion of total screen area available on a client device, particularly when bandwidth limitations restrict the resolution of streaming video. Although media players often include a "full screen" viewing option, many users prefer to watch video in a display area smaller than full screen, depending on the available video resolution. Accordingly, the video may appear in a relatively small area or window of an available display area, leaving unused areas. A video provider may occupy the unused area with other content or interface objects, including additional advertising, such as, for example, banner ads. Banner ads or similar additional content may be provided with links to an additional web site or page, so that when a user "clicks on" or otherwise selects the banner ad, the additional web site or page opens in a new window. Additional screen space, when available, may also be used for displaying additional information responsive to selection of links associated with face tracks in video content, as described in more detail elsewhere herein.

Figure 9:
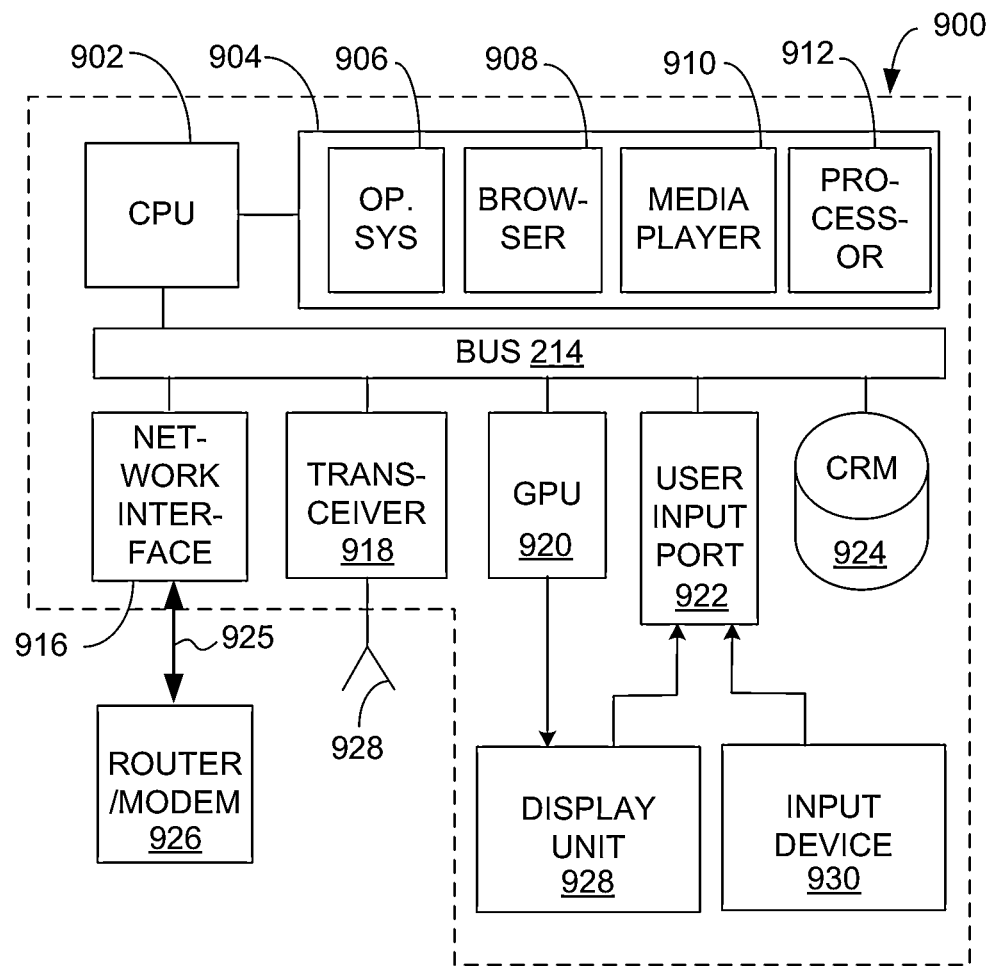
FIG. 9 depicts a diagrammatic view of an apparatus for processing video content to track images appearing in video according to one embodiment.

Referring to FIG. 9, a diagrammatic view of an apparatus 900 for processing video content to track images appearing in video is illustrated. In selected embodiments, the apparatus 900 may include a processor 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include additional information processor 912 for outputting additional information for tracked objects through multiple frames of a video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection 925. In the alternative, or in addition, the apparatus 900 may include a transceiver 918 connected to an antenna 928, through which the apparatus 900 may communicate wirelessly with a base station for a wireless communication system or with the router/modem 926. In the alternative, the apparatus 900 may communicate with a content serving system 100 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   determining, by a computing device, a first local binary pattern for a first image in a video;
   determining, by the computing device, a second local binary pattern for a second image in the video;
   determining, by the computing device, an optical flow between the first image and the second image based on a distance between the first local binary pattern and the second local binary pattern, wherein the distance measured between the first local binary pattern and the second local binary pattern is between binary numbers representing the first local binary pattern and the second local binary pattern, and wherein the distance between the first local binary pattern and the second local binary pattern is a summation of square Euclidean distances; and outputting, by the computing device, the optical flow for use in aligning the first image to the second image.

2. The method of claim 1, wherein each Euclidean distance corresponds to one direction of a gradient image from the first image and the second image.

3. A method comprising:

determining, by a computing device, a first local binary pattern for a first image in a video:

determining, by the computing device, a second local binary pattern for a second image in the video;

determining, by the computing device, an optical flow between the first image and the second image based on a distance between the first local binary pattern and the second local binary, wherein the optical flow is determined by minimizing an error function as follows:

$$J(p) = \sum_x d_H(LBP(I(W(x; p))), LBP(T(x)))$$
$$= \sum_{n=1}^{N} \sum_x (LBP_n(I(W(x; p))) - LBP_n(T(x)))^2,$$

where J(p) is an error function for transformation parameters p, N is a number of binary bits, $d_H$ is a Hamming distance between the first local binary pattern and the second local binary pattern, and LBP is the local binary pattern, I is the first image, T is the second image, and W(x; p) is a warp between the first image and the second image: and outputting, by the computing device, the optical flow for use in aligning the first image to the second image.

4. The method of claim 3, wherein the error function is solved as a non-linear least square problem.

5. A method comprising:

determining, by a computing device, a first local binary pattern for a first image in a video:

determining, by the computing device, a second local binary pattern for a second image in the video, wherein determining the first local binary pattern and the second local binary pattern comprises using a soft step function that includes a slope in a transition between values of 0 and 1 to determine a first soft local binary pattern and a second soft local binary pattern;

determining, by the computing device, an optical flow between the first image and the second image based on a distance between the first soft local binary pattern and the second soft local binary pattern; and outputting, by the computing device, the optical flow for use in aligning the first image to the second image.

6. The method of claim 5, wherein the soft step function comprises a piecewise linear function or a sigmoid function.

7. The method of claim 5, wherein the soft step function is used to determine soft binary values for the first local binary pattern and the second local binary pattern.

8. The method of claim 5, wherein the optical flow is determined by minimizing an error function as follows:

$$J(p) = \sum_{n=1}^{N} \sum_x (SLBP_n(I(W(x; p))) - SLBP_n(T(x)))^2$$

where J(p) is an error function for transformation parameters p, N is a number of binary bits, SLBP is the soft local binary pattern using the soft step function, I is the first image, T is the second image, and W(x; p) is a warp between the first image and the second image.

9. A method comprising:

determining, by a computing device, a first local binary pattern for a first image in a video:

determining, by the computing device, a second local binary pattern for a second image in the video;

determining, by the computing device, an optical flow between the first image and the second image based on a distance between the first local binary pattern and the second local binary pattern, wherein the first local binary pattern and the second local binary pattern are determined based on gradients in a set of directions from a reference in the first image and the second image, respectively;

determining by the computing device, an optical flow between the first image and the second image based on a distance between the first local binary pattern and the second local binary pattern, wherein a second set of gradients less than a first set of gradients is used to calculate the distance; and outputting, by the computing device, the optical flow for use in aligning the first image to the second image.

10. A non-transitory computer-readable storage medium containing instructions, that when executed, control a computer system to be configured for:

determining a first local binary pattern for a first image in a video;

determining a second local binary pattern for a second image in the video;

determining an optical flow between the first image and the second image based on a distance between the first local binary pattern and the second local binary pattern, wherein the distance measured between the first local binary pattern and the second local binary pattern is between binary numbers representing the first local binary pattern and the second local binary pattern, and wherein the distance between the first local binary pattern and the second local binary pattern is a summation of square Euclidean distances; and outputting the optical flow for use in aligning the first image to the second image.

11. A non-transitory computer-readable storage medium containing instructions, that when executed, control a computer system to be configured for:

determining a first local binary pattern for a first image in a video;

determining a second local binary pattern for a second image in the video;

determining an optical flow between the first image and the second image based on a distance between the first local binary pattern and the second local binary pattern, wherein the optical flow is determined by minimizing an error function as follows:

$$J(p) = \sum_x d_H(LBP(I(W(x; p))), LBP(T(x)))$$

$$= \sum_{n=1}^{N} \sum_x (LBP_n(I(W(x; p))) - LBP_n(T(x)))^2$$

where J(p) is an error function for transformation parameters p, N is a number of binary bits, $d_H$ is a Hamming distance between the first local binary pattern and the second local binary pattern, and LBP is the local binary pattern, I is the first image, T is the second image, and W(x; p) is a warp between the first image and the second image; and outputting the optical flow for use in aligning the first image to the second image.

12. The non-transitory computer-readable storage medium of claim 11, wherein the error function is solved as a non-linear least square problem.

13. A non-transitory computer-readable storage medium containing instructions, that when executed, control a computer system to be configured for:

determining a first local binary pattern for a first image in a video;

determining a second local binary pattern for a second image in the video, wherein determining the first local binary pattern and the second local binary pattern comprises using a soft step function that includes a slope in a transition between values of 0 and 1 to determine a first soft local binary pattern and a second soft local binary pattern;

determining an optical flow between the first image and the second image based on a distance between the first soft local binary pattern and the second soft local binary pattern; and outputting the optical flow for use in aligning the first image to the second image.

14. The non-transitory computer-readable storage medium of claim 13, wherein the soft step function comprises a piecewise linear function or a sigmoid function or other soft-step function.

15. The non-transitory computer-readable storage medium of claim 13, wherein the soft step function is used to determine binary values for the first local binary pattern and the second local binary pattern.

16. The non-transitory computer-readable storage medium of claim 13, wherein the optical flow is determined by minimizing an error function as follows:

$$J(p) = \sum_{n=1}^{N} \sum_x (SLBP_n(I(W(x; p))) - SLBP_n(T(x)))^2,$$

where J(p) is an error function for transformation parameters p, N is a number of binary bits, and SLBP is the soft local binary pattern using the soft step function, I is the first image, T is the second image, and W(x; p) is a warp between the first image and the second image.

17. A non-transitory computer-readable storage medium containing instructions, that when executed, control a computer system to be configured for:

determining a first local binary pattern for a first image in a video;

determining a second local binary pattern for a second image in the video;

determining an optical flow between the first image and the second image based on a distance between the first local binary pattern and the second local binary pattern, wherein the first local binary pattern and the second local binary pattern are determined based on gradients in a set of directions from a reference in the first image and the second image, respectively;

determining an optical flow between the first image and the second image based on a distance between the first local binary pattern and the second local binary pattern, wherein a second set of gradients less than a first set of gradients is used to calculate the distance; and outputting the optical flow for use in aligning the first image to the second image.

18. An apparatus comprising:

one or more computer processors; and a non-transitory computer-readable storage medium comprising instructions, that when executed, control the one or more computer processors to be configured for:

determining a first local binary pattern for a first image in a video;

determining a second local binary pattern for a second image in the video;

determining an optical flow between the first image and the second image based on a distance between the first local binary pattern and the second local binary pattern, wherein the distance measured between the first local binary pattern and the second local binary pattern is between binary numbers representing the first local binary pattern and the second local binary pattern, and wherein the distance between the first local binary pattern and the second local binary pattern is a summation of square Euclidean distances; and outputting the optical flow for use in aligning the first image to the second image.

* * * * *

UNITED STATES PATENT AND TRADEMARK OFFICE
CERTIFICATE OF CORRECTION

| | | |
|---|---|---|
| PATENT NO. | : 9,208,578 B2 | Page 1 of 1 |
| APPLICATION NO. | : 14/001488 | |
| DATED | : December 8, 2015 | |
| INVENTOR(S) | : Xiong et al. | |

It is certified that error appears in the above-identified patent and that said Letters Patent is hereby corrected as shown below:

In the claims

Column 15, claim 5, line 51, delete "0and 1" and insert --0 and 1--.

Signed and Sealed this
Twenty-ninth Day of March, 2016

Michelle K. Lee
*Director of the United States Patent and Trademark Office*